US006486247B1

(12) United States Patent
Faulkner

(10) Patent No.: US 6,486,247 B1
(45) Date of Patent: Nov. 26, 2002

(54) SCORCH INHIBITORS FOR BISPHENOL-CURED FLUOROELASTOMERS

(75) Inventor: Roger W. Faulkner, Whitman, MA (US)

(73) Assignee: Immix Technologies, Inc., Hanover, MA (US)

( * ) Notice: Subject to any disclaimer, the term of this patent is extended or adjusted under 35 U.S.C. 154(b) by 108 days.

(21) Appl. No.: 09/632,746

(22) Filed: Aug. 4, 2000

Related U.S. Application Data

(60) Provisional application No. 60/147,720, filed on Aug. 6, 1999.

(51) Int. Cl.$^7$ ................................................. C08K 5/101
(52) U.S. Cl. ........................ 524/292; 524/291; 524/287; 524/323; 524/336; 524/352; 524/492; 525/326.2
(58) Field of Search ........................... 525/326.2, 326.3, 525/384, 386; 524/292, 291, 336, 323, 352; 526/242, 254, 255

(56) References Cited

U.S. PATENT DOCUMENTS 4,578,065 A * 3/1986 Habib ........................ 604/336

5,756,588 A * 5/1998 Kolb et al. ............... 525/326.3

* cited by examiner

*Primary Examiner*—David W. Wu
*Assistant Examiner*—Rip Lee
(74) *Attorney, Agent, or Firm*—Mirick, O'Connell, DeMallie & Lougee, LLP

(57) ABSTRACT

The invention involves a means of increasing the scorch delay period (scorch time) for standard bisphnol-cured fluoroelastomers (abbreviated as "FKM;" these are copolymers of vinylidene fluoride and hexafluoropropene, optionally also containing additional monomers such as tetrafluoroethylene). The invention entails particular substituted monophenols (butylparaben or propylparaben) and/or mixtures of these with methylparaben and/or inorganic solids, and the inclusion of these particular substituted monophenols and/or blends in an FKM compound. These particular substituted monophenols are effective as scorch inhibitors of bisphenol-cured FKM, and are also effective as processing aid.

15 Claims, No Drawings

SCORCH INHIBITORS FOR BISPHENOL-CURED FLUOROELASTOMERS

This application claims the benefit of Provisional Application No. 60/147,720 filed Aug. 6, 1999.

BACKGROUND OF THE INVENTION

The chemistry of retarding scorch is necessarily linked to the crosslinking chemistry, such that different scorch retarders are required for each type of crosslinking system. FKM elastomers are believed to crosslink via a multistage process when bisphenol curatives are used, the first stage of which is dehydrofluorination to generate electron-deficient double bonds, followed by a Michael addition of bisphenol to generate a grafted bisphenol, followed by a second Michael addition of grafted bisphenol to generate a crosslink. Both the dehydrofluorination and the Michael addition reactions are usually catalyzed by quaternary ammonium or phosphonium salts. It has been observed that most of the bisphenol grafts before any of the grafted bisphenol adds to a second FKM chain (which creates crosslinks). Adding more bisphenol to a formulation increases the scorch time, while also increasing the final crosslink density. This observation led to a search for scorch delay additives that function by competing with bisphenol to delay the onset of crosslinking in FKM. U.S. Pat. No. 5,756,588 to Kolb and Jing (assigned to 3M) is the first patent to successfully utilize this mechanism to extend scorch delay of bisphenol-cured FKM. U.S. Pat. No. 5,756,588 teaches that electron-withdrawing substituents on the benzene ring of phenol are particularly desirable in scorch retarding monophenols.

Table 1 summarizes key findings reported in U.S. Pat. No. 5,756,588; these data also support the contention within U.S. Pat. No. 5,756,588 that electron-withdrawing substituents on a phenol ring increase the effectiveness of monophenol scorch inhibitors. According to the data of Table 1, p-cyanophenol (also known as 4-hydroxybenzonitrile) has the best balance of properties of all the tested compounds, as it simultaneously accelerates the cure by a factor of 1.5, and delays the onset of scorch by a factor of 2.08 under the test conditions.

Another relevant prior art patent is U.S. Pat. No. 4,446,270. This patent describes certain particular monophenols which also bear allyl functional groups. The purpose of these materials is to attach ("graft") the allyl functional group to an FKM polymer chain, as a means of increasing crosslink density and hardness. Some of the materials described in this patent may also function to delay the onset of scorch in bisphenol-cured fluoroelastomers, but this was not an objective of U.S. Pat. No. 4,446,270. Furthermore, this patent cites no evidence that an effect on scorch delay actually occurred.

TABLE 1

Data from U.S. Pat. No. 5,756,588

| Scorch Inhibitor Additive | ID # | ts2 | t'50 | t'90 | (t'90-ts2) | relative cure rate control(t'90-ts2)/ test/(t'90-ts2) | relative scorch delay ts2/(ts2, control) | Figure of merit |
|---|---|---|---|---|---|---|---|---|
| None (control) | C1 | 1.3 | 1.9 | 3.4 | 2.1 | 1.00 | 1.00 | 1.00 |
| 4-hydroxybenzophenone | 1 | 2.5 | 3.6 | 4.4 | 1.9 | 1.11 | 1.92 | 2.13 |
| 4-hydroxybenzylphenone | 2 | 3.4 | 4.7 | 6.1 | 2.7 | 0.78 | 2.62 | 2.03 |
| p-cyanophenol | 3 | 2.7 | 3.8 | 4.1 | 1.4 | 1.50 | 2.08 | 3.12 |
| o-cyanophenol | 4 | 2.2 | 3.3 | 4.9 | 2.7 | 0.78 | 1.69 | 1.32 |
| p-acetylphenol | 5 | 2.5 | 3.6 | 4.7 | 2.2 | 0.95 | 1.92 | 1.84 |
| p-nitrophenol | 6 | 4.2 | 5.7 | 7.2 | 3 | 0.70 | 3.23 | 2.26 |
| o-nitrophenol | 7 | 2 | 3.4 | 5.7 | 3.7 | 0.57 | 1.54 | 0.87 |
| m-nitrophenol | 8 | 2.5 | 3.5 | 4.7 | 2.2 | 0.95 | 1.92 | 1.84 |
| methylparaben | 9 | 2.1 | 2.9 | 3.9 | 1.8 | 1.17 | 1.62 | 1.88 |
| p-trifluoromethylphenol | 10 | 1.7 | 2.6 | 5 | 3.3 | 0.64 | 1.31 | 0.83 |
| p-fluorophenol | 11 | 1.3 | 1.8 | 2.7 | 1.4 | 1.50 | 1.00 | 1.50 |
| p-chlorophenol | 12 | 1.8 | 2.7 | 3.5 | 1.7 | 1.24 | 1.38 | 1.71 |
| p-bromophenol | 13 | 1.8 | 2.5 | 3.4 | 1.6 | 1.31 | 1.38 | 1.82 |
| p-(aminoacetic acid)phenol | 14 | 1.9 | 2.9 | 4.3 | 2.4 | 0.88 | 1.46 | 1.28 |
| p-carboxyphenol | 15 | 2.2 | 3.5 | 5.3 | 3.1 | 0.68 | 1.69 | 1.15 |
| m-carboxyphenol | 16 | 2.2 | 3.5 | 5.6 | 3.4 | 0.62 | 1.69 | 1.05 |
| p-phenylphenol | 17 | 2.1 | 3.1 | 3.8 | 1.7 | 1.24 | 1.62 | 2.00 |
| p-methylolphenol | 18 | 2.1 | 3.4 | 5.3 | 3.2 | 0.66 | 1.62 | 1.06 |
| o-aminophenol-N-acetamide | 19 | 1.9 | 2.8 | 4.2 | 2.3 | 0.91 | 1.46 | 1.33 |
| p-aminophenol-N-acetamide | 20 | 2 | 3 | 3.9 | 1.9 | 1.11 | 1.54 | 1.70 |
| 3,5-dichlorophenol | 21 | 2.9 | 3.9 | 4.8 | 1.9 | 1.11 | 2.23 | 2.47 |
| 2,6-dibromophenol | 22 | 2.3 | 4.2 | 11.8 | 9.5 | 0.22 | 1.77 | 0.39 |

(All monophenols listed were compared in an identical FKM basis formulation, with constant molar level of monophenol additive, except for the control; see U.S. Pat. No. 5,756,588 for details.)

Many of the particular monophenols described U.S. Pat. No. 5,756,588 in U.S. Pat. No. 5,756,588 are either toxic, or are relatively expensive. Among the monophenols described in U.S. Pat. No. 5,756,588, perhaps the least toxic chemical is methylparaben, which is commonly used as a preservative in various topical ointments. Unfortunately, methylparaben slows the cure of FKM while delaying the onset of scorch. Methylparaben has also been found to be difficult to disperse properly; in many instances formulations containing methylparaben must be re-milled to achieve proper dispersion.

SUMMARY OF THE INVENTION

A particular scorch inhibiting monophenol additive, butylparaben, has been found which has surprising cure system activity compared to methylparaben, an analogous chemical that was described in the prior art U.S. Pat. No. 5,756,588. Butylparaben is also effective as a processing aid, in a variety of different elastomer systems. Although the prior art U.S. Pat. No. 5,756,588 teaches that improved activity corresponds to electron withdrawing substituents on the phenol ring, the butyl group is relatively electronreleasing, so it is surprising that butylparaben increases rather than decreases both cure rate and efficiency in inhibiting scorch, especially when compared to methylparaben. Propylparaben has intermediate activity, and is not in and of itself highly desirable over methylparaben.

It was suspected that the increased activity of butylparaben over methylparaben and propylparaben is due to its lower melt point; therefore various melt blends of butylparaben, methylparaben, and propylparaben were prepared in order to map out the melt point of the blends versus concentration. It was found that low-melting eutectic mixtures form which remain fluid for extended times at temperatures as low as 50° C. The very lowest melting/solidifying mixtures contain more than 30% by weight of butylparaben, and these mixtures would be particularly suitable for liquid injection systems for scorch delay additives into an internal mixer or extruder. and are not as desirable as the mixtures that melt/solidify around 75° C. Among these mixtures, the most economical mixtures which melt/solidify around 75° C. consist of approximately 10% butylparaben, 40% propylparaben, and 50% methylparaben.

When said eutectics are cooled, large methylparaben crystals formed which made the resultant flakes difficult to disperse into FKM elastomer, although once the dispersion was accomplished, these eutectic mixtures exhibited equivalent effectiveness to butylparaben at lower cost. Subsequent experiments showed that addition of colloidal silica interfered with recrystallization of the eutectic to a sufficient extent that large crystals did not form during cooling. Eutectic mixtures of methylparaben, propylparaben, and a minor portion of butylparaben can be mixed with various colloidal mineral fillers, then cooled to powder, flakes, pellets, or pastilles which are not dusty, and which readily disperse into typical FKM compounds. These solidified, colloidal mineral-containing eutectic paraben mixtures contain only small methylparaben crystals, which leads to rapid uniform dispersion into FKM, even at processing temperatures slightly below the melting temperature of the eutectic.

DETAILED DESCRIPTION AND PREFERRED EMBODIMENTS

Butylparaben per se is quite useful both for increasing scorch delay and improving processability of FKM compounds. It is surprisingly more effective than either methylparaben or propylparaben. It has low toxicity, and is commercially available. Unfortunately, it is more expensive than methylparaben or propylparaben.

Eutectic mixtures of parabens containing only a minor portion of butylparaben are also quite useful both for increasing scorch delay and improving processability of FKM compounds. Eutectic mixtures of approximately 50% methylparaben, 40% propylparaben, and 10% butylparaben have an equilibrium melting/freezing temperature around 75° C., and cure system activity very similar to butylparaben, at lower cost. This mixture is melted together, then this melt is mixed with about 5–15% of various colloidal silicas (hydrophobic silanized fumed silicas are particularly preferred), then cooled to flakes, pellets, or pastilles which are not dusty, and which readily disperse into typical FKM compounds.

Experimental Data

Various mixtures of methylparaben, propylparaben, and butylparaben were prepared (~6 grams total of parabens in open aluminum containers), then melted in an oven just above the melting point of methylparaben. After the mixtures were uniformly mixed & melted, the oven temperature was dropped incrementally, and the temperatures at which crystallization was first observed was noted. Table 2 gives the and Eutectic mixtures of approximately 50% methylparaben, 40% propylparaben, and 10% butylparaben could be mixed with various colloidal silicas, then cooled to flakes, pellets, or pastilles which are not dusty, and which readily disperse into typical FKM compounds.

TABLE 2

| Melt Blends of Parabens to Lower Melt Point (Eutectics) | | | | | | | |
|---|---|---|---|---|---|---|---|
| Raw Materials: | | sp. gr. | | | $/lb. | | |
| Methylparaben | | 1.120 | | | $3.63 | | |
| Propylparaben | | 1.100 | | | $3.86 | | |
| Butylparaben | | 1.080 | | | $5.58 | | |
| | Raw Data on Blends | | | | | | |
| RF1-104- | B | C | D | E | F | G | Q |
| Methylparaben | 3.003 | 3.0012 | 2.0073 | 1.5076 | 2.006 | 2.5014 | 0 |
| Propylparaben | 2.9981 | 0 | 2.0183 | 3.0072 | 2.9977 | 3.0024 | 3.0124 |
| Butylparaben | | 3.0068 | 1.9952 | 1.517 | 1.0921 | 0.509 | 2.9936 |
| total: | 6.0011 | 6.008 | 6.0208 | 6.0318 | 6.0958 | 6.0128 | 6.006 |
| Weight % methyl: | 50.0% | 50.0% | 33.3% | 25.0% | 32.9% | 41.6% | 0.0% |
| Weight % propyl: | 50.0% | 0.0% | 33.5% | 49.9% | 49.2% | 49.9% | 50.2% |
| Weight % butyl: | 0.0% | 50.0% | 33.1% | 25.2% | 17.9% | 8.5% | 49.8% |
| $/pound | $3.742 | $4.605 | $4.351 | $4.232 | $4.090 | $3.907 | $4.715 |
| Freezing Temperature | 70 | 75 | 45 | 55 | 55 | 55 | 50 |
| Melting 90+ Temperature | no data | 70– | 70– | 70– | | 80 | 70 |

(approximate temperatures; after 1 hour at that T.

Sample 107A is composed of 45% propylparaben, 36% methylparaben, 9% butylparaben, melted together, with 10% Aerosil R-972 by weight added to the melt and well-dispersed; thereafter the melt was rapidly cooled, and broken up. The softening characteristics are like 104G, but it does not have large, hard-to-disperse crystals in it after cooling.

FKM compounds were prepared using both the individual parabens and the various melt-blended parabens described above. In all cases these compounds were based on addition of parabens to a pre-mixed standard FKM compound consisting of 100 parts of Fluorel 2174 from Dyneon, LLC (a standard, commercially available cure-containing FKM polymer that contains undisclosed concentrations of bisphenol curative and quaternary phosphonium accelerator), 30 parts of N-990 carbon black, 6 parts of calcium hydroxide, and 3 parts of magnesium oxide. This compound shall be described herein as the FKM Control. The various additives of the present invention were mill mixed into this compound, and cure properties were evaluated with a Monsanto Oscillating Disk Rheometer (ODR). Recipe details and ODR results are given in Table 3.

TABLE 3

FKM Compounds Including Parabens and Mixtures Thereof

| Ingredient | | | | | | |
|---|---|---|---|---|---|---|
| FKM Control | 139 | 139 | 139 | 139 | 139 | 139 |
| Methylparaben | | 1 | | | | |
| Propylparaben | | | 1 | | | |
| butylparaben | | | | 1 | | |
| RF3-104G | | | | | 1 | |
| RF3-107A | | | | | | 1.1 |
| (ODR results @ 177 degrees C.) | | | | | | |
| ML (ODR) | 14.0 | 11.8 | 12.8 | 12.4 | 12.5 | 12.4 |
| MH (ODR) | 120.7 | 126.4 | 127.5 | 130.0 | 129.8 | 130.2 |
| ts2 | 1.52 | 2.60 | 2.5 | 2.62 | 2.64 | 2.66 |
| t'50 | 2.48 | 3.8 | 3.78 | 3.77 | 3.78 | 3.75 |
| t'90 | 2.90 | 4.15 | 4.15 | 4.10 | 4.14 | 4.08 |

As is clear from the data, butyl paraben is more effective than methylparaben or propylparaben. Also, various eutectic paraben mixtures are unexpectedly more effective than the additive effects of the components.

What is claimed is:

1. A melt blend of 0–60% methylparaben, 20–60% propylparaben, and 5–40% butylparaben, with melting temperature below 95 degrees C.

2. A method of increasing the scorch time for bisphenol-cured fluoroelastomer (FKM) compounds comprising adding sufficient melt blend of claim 1 in order to add from 0.1 to 2% by weight of butylparaben to the compounds.

3. A bisphenol-cured flutoelastomer produced by the method of claim 2.

4. A melt blend of claim 1 containing 35–45% methylparaben, 45–55% propylparaben, and 5–15% butylparaben.

5. A melt blend of claim 4 which also contains 2–40% by weight of a colloidal mineral filler.

6. A solidified polycrystalline solid derived by rapidly cooling the melt of claim 5.

7. A melt blend of claim 4 which contains 5–15% by weight of a colloidal silica.

8. A melt blend of claim 7 that in which the colloidal silica is comprised of silanized fumed silica.

9. A solidified polycrystalline solid derived by rapidly cooling the melt of claim 8.

10. FKM compounds that incorporate from 0.1 to 2% by weight of the material of claim 4.

11. FKM compounds that incorporate from 0.1 to 3% by weight of the material of claim 5.

12. FKM compounds that incorporate from 0.1 to 3% by weight of the material of claim 6.

13. FKM compounds that incorporate from 0.1 to 3% by weight of the material of claim 7.

14. FKM compounds that incorporate from 0.1 to 3% by weight of the material of claim 8.

15. FKM compounds that incorporate from 0.1 to 3% by weight of the material of claim 9.

* * * * *